US010017225B2

(12) United States Patent
Usui et al.

(10) Patent No.: US 10,017,225 B2
(45) Date of Patent: Jul. 10, 2018

(54) BICYCLE TRANSMISSION CONTROL DEVICE

(71) Applicant: Shimano Inc., Sakai, Osaka (JP)

(72) Inventors: Makoto Usui, Osaka (JP); Jun Gao, Osaka (JP); Yasuhiro Tsuchizawa, Osaka (JP); Yuki Kataoka, Osaka (JP); Akinori Hashimoto, Osaka (JP); Masako Itsukashi, Osaka (JP)

(73) Assignee: Shimano Inc., Osaka (JP)

( * ) Notice: Subject to any disclaimer, the term of this patent is extended or adjusted under 35 U.S.C. 154(b) by 331 days.

(21) Appl. No.: 14/871,652

(22) Filed: Sep. 30, 2015

(65) Prior Publication Data
US 2016/0101827 A1    Apr. 14, 2016

(30) Foreign Application Priority Data

Oct. 8, 2014  (JP) ................................. 2014-207513
May 29, 2015  (JP) ................................. 2015-110716

(51) Int. Cl.
*B62M 25/08*    (2006.01)

(52) U.S. Cl.
CPC ................................ *B62M 25/08* (2013.01)

(58) Field of Classification Search
CPC ............ B62M 25/08; B62M 2025/006; B62M 2701/0046
See application file for complete search history.

(56) References Cited

U.S. PATENT DOCUMENTS

| 4,490,127 | A | * | 12/1984 | Matsumoto | ............ | B62M 9/122 |
| | | | | | | 280/236 |
| 2003/0216201 | A1 | * | 11/2003 | Takeda | ..................... | B62M 9/10 |
| | | | | | | 474/70 |
| 2009/0164076 | A1 | * | 6/2009 | Vasiliotis | ............... | B62M 11/16 |
| | | | | | | 701/55 |
| 2013/0054067 | A1 | * | 2/2013 | Shoge | ..................... | B62M 6/45 |
| | | | | | | 701/22 |

FOREIGN PATENT DOCUMENTS

| CN | 1379721 A | 11/2002 |
| JP | 9-123978 A | 5/1997 |
| JP | 10-511621 A | 11/1998 |
| JP | 11-240481 A | 9/1999 |
| JP | 3717076 B2 | 11/2005 |
| WO | 01/14203 A1 | 3/2001 |

\* cited by examiner

*Primary Examiner* — Edwin Young
(74) *Attorney, Agent, or Firm* — Global IP Counselors, LLP

(57) ABSTRACT

A bicycle transmission control device is basically provided with a transmission controller that is programmed to switch between a first control state and a second control state. The bicycle transmission control device operates in accordance with the first control state for controlling a transmission based on a first signal that is input from a first detector, which detects a rotation of a crank. The bicycle transmission control device operates in accordance with the second control state for controlling the transmission based on a second signal that is input from a second detector, which detects a value reflecting a bicycle speed.

25 Claims, 10 Drawing Sheets

BICYCLE TRANSMISSION CONTROL DEVICE

CROSS-REFERENCE TO RELATED APPLICATIONS

This application claims priority to Japanese Patent Application No. 2014-207513, filed on Oct. 8, 2014 and Japanese Patent Application No. 2015-110716, filed on May 29, 2015. The entire disclosures of Japanese Patent Application No. 2014-207513 and Japanese Patent Application No. 2015-110716 are hereby incorporated herein by reference.

BACKGROUND

Field of the Invention

This invention generally relates to a bicycle transmission control device. More specifically, the present invention relates to a bicycle transmission control device for changing a gear ratio of a transmission.

Background Information

Some bicycles are provided with an automatic gear changing mode that is controlled by a bicycle transmission control device for changing a gear ratio of a transmission. One example of a conventional bicycle transmission control device is disclosed in Japanese Laid-Open Patent Publication No. 1997-123978. In this conventional bicycle transmission control device, the transmission is controlled based only on signals output from either a cadence sensor or a vehicle speed sensor so that the rotational speed of a crank is maintained for a certain range.

SUMMARY

Generally, the present disclosure is directed to various features of a bicycle transmission control device. In the above mentioned conventional bicycle transmission control device, there is a risk that the gear ratio is changed at an inappropriate time depending on the traveling state of the bicycle.

One object of the present invention is to provide a bicycle transmission control device that is configured to change the gear ratio at an appropriate time as compared to the conventional technology.

In view of the state of the known technology and in accordance with a first aspect of the present disclosure, a bicycle transmission control device is provided that basically comprises a transmission controller that is programmed to switch between a first control state and a second control state. The bicycle transmission control device operates in accordance with the first control state for controlling a transmission based on a first signal that is input from a first detector, which detects a rotation of a crank. The bicycle transmission control device operates in accordance with the second control state for controlling the transmission based on a second signal that is input from a second detector, which detects a value reflecting a bicycle speed.

In accordance with a second aspect of the present invention, the bicycle transmission control device according to the first aspect is configured so that the second detector detects a rotation of a wheel of the bicycle.

In accordance with a third aspect of the present invention, the bicycle transmission control device according to the first or second aspect is configured so that the first control state and the second control state are switched based on the first signal and the second signal.

In accordance with a fourth aspect of the present invention, the bicycle transmission control device according to the first or second aspect is configured so that the first control state and the second control state are switched based on the first signal, the second signal and a manual drive force that is applied to the crank.

In accordance with a fifth aspect of the present invention, the bicycle transmission control device according to the first or second aspect is configured so that the first control state and the second control state are switched based on a manual drive force that is applied to the crank.

In accordance with a sixth aspect of the present invention, the bicycle transmission control device according to the third aspect is configured so that the transmission controller is further programmed to output a control signal for controlling the transmission based on the first signal when a rotational speed of the crank based on the first signal is greater than or equal to a maximum rotational speed of the crank based on the second signal.

In accordance with a seventh aspect of the present invention, the bicycle transmission control device according to the third or sixth aspect is configured so that the transmission controller is further programmed to output a control signal for controlling the transmission based on the second signal when a maximum rotational speed of the crank based on the second signal is greater than a rotational speed of the crank based on the first signal.

In accordance with an eighth aspect of the present invention, the bicycle transmission control device according to the fourth aspect is configured so that the transmission controller is further programmed to output a control signal for controlling the transmission based on the second signal when a maximum rotational speed of the crank based on the second signal is greater than the rotational speed of the crank based on the first signal, and the manual drive force is less than a prescribed value.

In accordance with a ninth aspect of the present invention, the bicycle transmission control device according to the fourth or eighth aspect is configured so that the transmission controller is further programmed to output a control signal for controlling the transmission based on the first signal when a maximum rotational speed of the crank based on the second signal is greater than the rotational speed of the crank based on the first signal, and the manual drive force is greater than or equal to a prescribed value.

In accordance with a tenth aspect of the present invention, the bicycle transmission control device according to the fifth aspect is configured so that the transmission controller is further programmed to output a control signal for controlling the transmission based on the first signal when the manual drive force is greater than or equal to a prescribed value.

In accordance with an eleventh aspect of the present invention, the bicycle transmission control device according to the fifth or tenth aspect is configured so that the transmission controller is further programmed to output a control signal for controlling the transmission based on the second signal when the manual drive force is less than a prescribed value.

In accordance with a twelfth aspect of the present invention, the bicycle transmission control device according to any one of the fourth, fifth and eighth to eleventh aspects is configured so that the manual drive force is obtained based on the third signal that is input from a drive force sensor that outputs the third signal in response to a manual drive force that is applied to the crank.

In accordance with a thirteenth aspect of the present invention, the bicycle transmission control device according to any one of the first to twelfth aspects is configured so that the transmission controller is further programmed to output a control signal for controlling the transmission when controlling the transmission based on the first signal so that the rotational speed of the crank based on the first signal will be a prescribed crank rotational speed or a crank rotational speed within a prescribed range.

In accordance with a fourteenth aspect of the present invention, the bicycle transmission control device according to any one of the first to thirteenth aspects is configured so that the transmission controller is further programmed to output a control signal for controlling the transmission when controlling the transmission based on the second signal so that the maximum rotational speed of the crank based on the second signal will be a prescribed crank rotational speed or a crank rotational speed within a prescribed range.

In accordance with a fifteenth aspect of the present invention, the bicycle transmission control device according to the fourteenth aspect is configured so that the maximum rotational speed of the crank based on the second signal is obtained based on the second signal, information related to a gear ratio, and information related to at least one of a wheel diameter, a wheel radius, or a wheel circumference.

In accordance with a sixteenth aspect of the present invention, the bicycle transmission control device according to any one of the first to fifteenth aspects is configured so that the transmission controller is further programmed to output a control signal for controlling the transmission based on the second signal when an abnormality has occurred with the first signal.

In accordance with a seventeenth aspect of the present invention, the bicycle transmission control device according to any one of the first to sixteenth aspects is configured so that the transmission controller is further programmed to output a control signal for controlling the transmission based on the first signal when an abnormality has occurred with the second signal.

In accordance with an eighteenth aspect of the present invention, the bicycle transmission control device according to the second aspect, or any one of the third to seventeenth aspects having the second aspect, is configured so that the first detector detects a minimum angle in one rotation of the crank that is smaller than a minimum angle in one rotation of the wheel that can be detected by the second detector.

In accordance with a nineteenth aspect of the present invention, the bicycle transmission control device according to any one of the first to eighteenth aspects is configured so that the transmission controller is further configured to operate the transmission so that the gear ratio becomes greater when the transmission is controlled based on the first signal and when the rotational speed of the crank is greater than or equal to a first upper limit value. The transmission controller is further configured to operate the transmission so that the gear ratio becomes smaller when the transmission is controlled based on the first signal and when the rotational speed of the crank is less than or equal to a first lower limit value. The transmission controller is further configured to operate the transmission so that the gear ratio becomes greater when the transmission is controlled based on the second signal and when the maximum rotational speed of the crank corresponding to the second signal is greater than or equal to a second upper limit value. The transmission controller is further configured to operate the transmission so that the gear ratio becomes smaller when the transmission is controlled based on the second signal and when the maximum rotational speed of the crank corresponding to the second signal is less than or equal to a second lower limit value.

In accordance with a twentieth aspect of the present invention, the bicycle transmission control device according to the nineteenth aspect is configured so that the transmission controller is further configured to set the second upper limit value to be less than the first upper limit value.

In accordance with a twenty-first aspect of the present invention, the bicycle transmission control device according to the nineteenth or twentieth aspect is configured so that the transmission controller is further configured to set the second lower limit value to be greater than the first lower limit value.

In accordance with a twenty-second aspect of the present invention, the bicycle transmission control device according to any one of the nineteenth to twenty-first aspects is configured so that the transmission controller is further configured to set a range between the second upper limit value and the second lower limit value to be 25 to 50% of a range between the first upper limit value and the first lower limit value.

In accordance with a twenty-third aspect of the present invention, the bicycle transmission control device according to any one of the nineteenth to twenty-second aspects is configured so that the transmission controller is further configured to not operate the transmission when the rotational speed of the crank reaches a range below the first upper limit value and above the first lower limit value during a period from when the rotational speed of the crank is greater than or equal to the first upper limit value or less than or equal to the first lower limit value until when a first standby period elapses, when the transmission is controlled based on the first signal. Also the transmission controller is further configured to not operate the transmission when the rotational speed of the crank reaches a range below the second upper limit value and above the second lower limit value during a period from when the maximum rotational speed of the crank is greater than or equal to the second upper limit value or less than or equal to the second lower value until when a second standby period elapses, when the transmission is controlled based on the second signal.

In accordance with a twenty-fourth aspect of the present invention, the bicycle transmission control device according to the twenty-third aspect is configured so that the transmission controller is further configured to set the second standby period to be less than or equal to the first standby period.

In accordance with a twenty-fifth aspect of the present invention, the bicycle transmission control device according to the twenty-third aspect is configured so that the transmission controller is further configured to set the first standby period and the second standby period based on a travel load of the bicycle.

In accordance with a twenty-sixth aspect of the present invention, the bicycle transmission control device according to the twenty-fifth aspect is configured so that the transmission controller is further configured to set the second standby period to be less than or equal to the first standby period when the travel load of the bicycle is included in the same range.

In accordance with a twenty-seventh aspect of the present invention, the bicycle transmission control device according to the twenty-sixth aspect is configured so that the transmission controller is further configured to not operate the transmission the first standby period and the second standby period are set based on a previous shifting operation of the transmission and the travel load of the bicycle.

With the above configurations, the bicycle transmission control device is configured to change the gear ratio at an appropriate time as compared to the conventional technology.

Also other objects, features, aspects and advantages of the disclosed bicycle transmission control device will become apparent to those skilled in the art from the following detailed description, which, taken in conjunction with the annexed drawings, discloses illustrative embodiments of the bicycle transmission control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
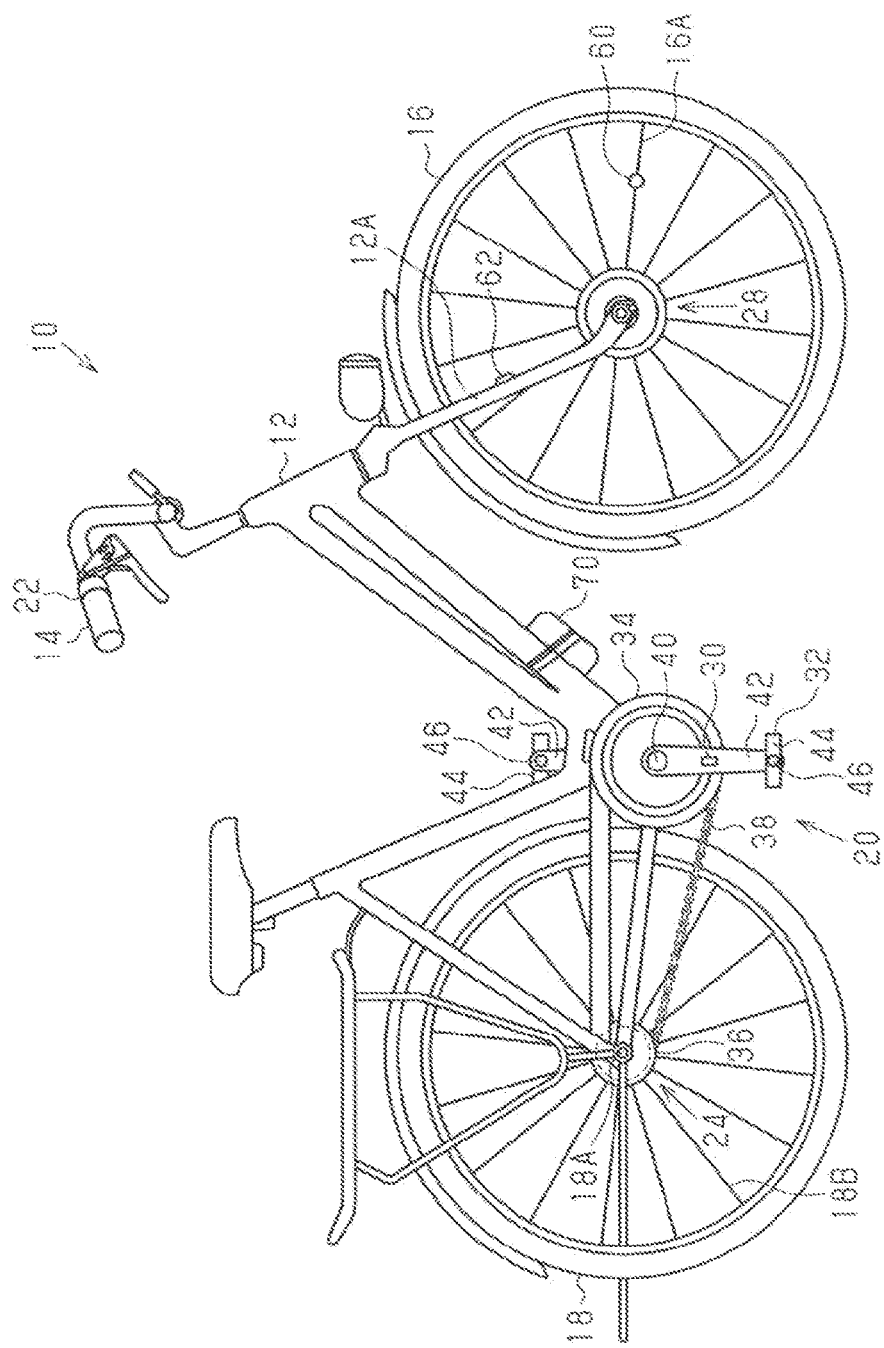
FIG. 1 is a side elevational view of a bicycle that is equipped with a bicycle transmission control device in accordance with a first embodiment.

Referring initially to FIG. 1, a bicycle 10 is illustrated that is equipped with a bicycle transmission control device in accordance with a first embodiment. The bicycle 10 comprises a frame 12, a handlebar 14, a front wheel 16, a rear wheel 18 and a drive mechanism 20, a gear changing control apparatus 22, a gear shifting device 24, a first detection device 26 (see FIG. 2), a second detection device 28 (see FIG. 2) and a drive force sensor 30. The drive mechanism 20 comprises a front sprocket 34, a rear sprocket 36, a chain 38, a pair of cranks 42 and a pair of pedals 44.

The bicycle transmission control device basically comprises a gear changing state detection device 68 (see FIG. 2) and a control device 70. The control device 70 constitutes a transmission controller that includes at least one processor and at least one memory device with one or more control programs prestored therein. The bicycle transmission control device further comprises the first detection device 26, the second detection device 28 and the drive force sensor 30. The first detection device 26, the second detection device 28 and the drive force sensor 30 output detection signals to the control device 70 as explained below.

The crank 42 comprises a crankshaft 40 that is rotatably supported by the frame 12 and left and right cranks 42. Each of the left and right pedals 44 comprises a pedal shaft 46. The left and right cranks 42 are attached to a crankshaft 40. The main body of the pedal 44 is rotatably attached to the crank 42 about the pedal shaft 46.

The front sprocket 34 is coupled to the crankshaft 40. The front sprocket 34 is provided coaxially with the crankshaft 40. The front sprocket 34 can be coupled so as to not rotate relatively with the crankshaft 40 or via a one-way clutch (diagram omitted) so that the front sprocket 34 will roll forward when the crankshaft 40 rolls forward.

The rear sprocket 36 is rotatably attached around an axle 18A of the rear wheel 18. The rear sprocket 36 is coupled with the rear wheel 18 via a one-way clutch. The chain 38 is wound onto the front sprocket 34 and the rear sprocket 36. When the cranks 42 rotate due to a manual drive three that is applied to the pedals 44, the rear wheel 18 is rotated by the front sprocket 34, the chain 38, and the rear sprocket 36.

The gear changing control apparatus 22 is attached to the handlebar 14. The gear changing control apparatus 22 is electrically connected to the control device 70 by a cable that is not diagrammed. When the gear changing control apparatus 22 is operated by a rider, the gear changing control apparatus 22 transmits an upshift signal or a downshift signal to the control device 70. Upshifting is a shift in the direction that increases the gear ratio γ, and downshifting is a shift in the direction that decreases the gear ratio γ.

Figure 2:
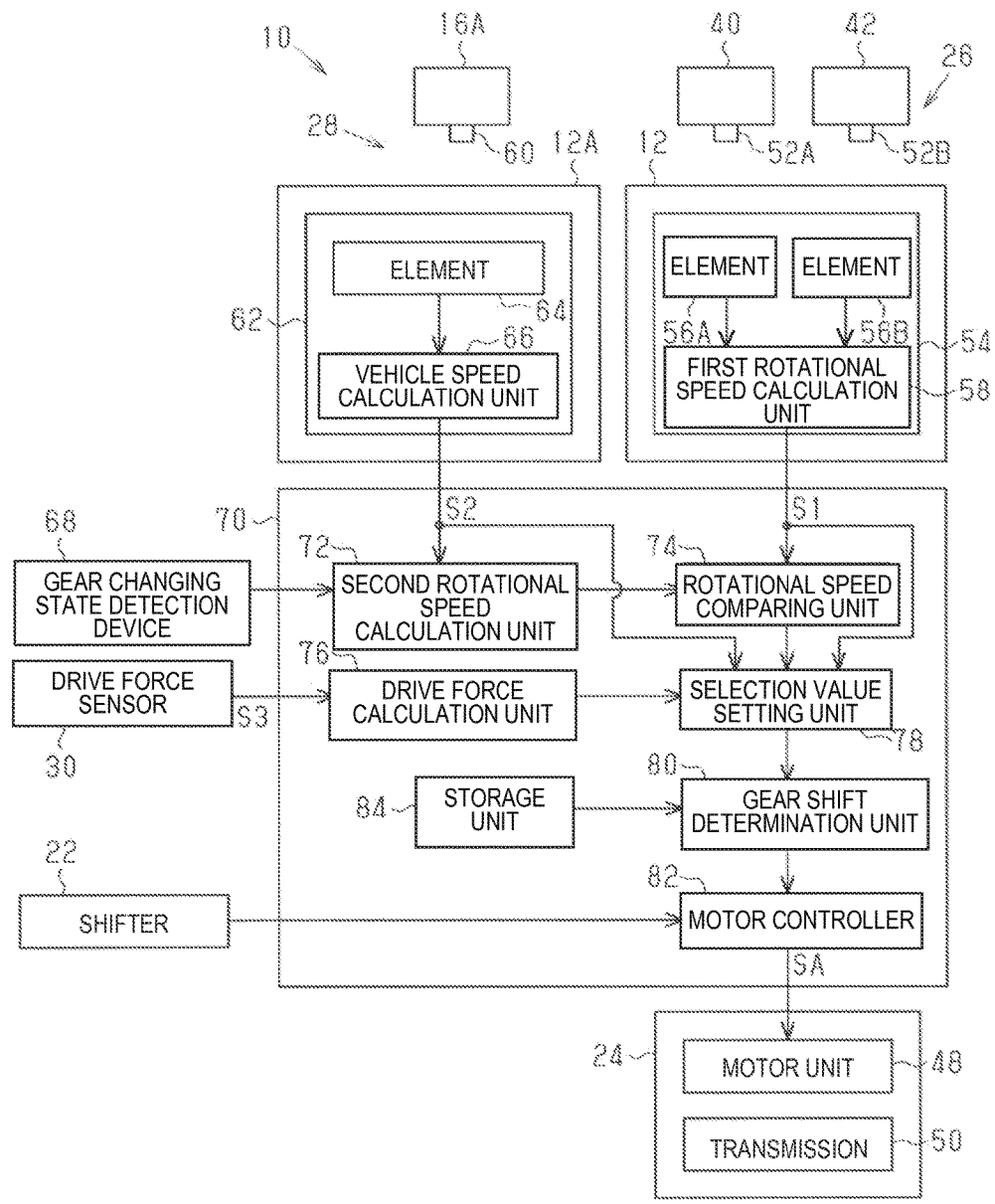
FIG. 2 is a block diagram showing an electrical configuration of the bicycle transmission control device for the bicycle illustrated in FIG. 1.

As shown in FIG. 2, the gear shifting device 24 comprises a motor unit 48 and a transmission 50. The transmission 50 is realized by an internal transmission that is integrated with a hub of the rear wheel 18 (refer to FIG. 1). The transmission 50 is formed comprising a planetary gear mechanism that is controlled by the motor unit 48. The transmission 50 changes the gear ratio γ in a stepwise manner. The motor unit 48 changes the gear ratio γ by changing the coupling state of the gears that form the planetary gear mechanism of the transmission 50. The motor unit 48 is electrically connected to the control device 70 by a cable that is not diagrammed. The motor unit 48 comprises an electric motor and a reduction gear for reducing the output rotation of the electric motor. The electric motor is connected to the transmission 50 via the reduction gear.

The first detection device 26 detects the rotation of one of the cranks 42 (refer to FIG. 1). The first detection device 26 comprises two magnets 52A and 52B, as well as a first detector 54 that is attached to the frame 12. The magnet 52A is an annular magnet, in which several magnetic poles are alternately arranged side by side in the circumferential direction. The magnet 52A is provided to the crankshaft 40 or one of the cranks 42, and is disposed coaxially with the crankshaft 40. The magnet 52B is attached to one of the left and right cranks 42.

The first detector 54 is electrically connected to the control device 70 by a cable that is not diagrammed. The first detector 54 transmits a first signal S1 to the control device 70 in response to the rotation of the cranks 42. The first detector 54 is a so-called cadence sensor. The first detector 54 comprises an element 56A and an element 56B. The element 56A detects a relative angular position of one of the cranks 42 with respect to the frame 12. The element 56A outputs a value corresponding to changes in the magnetic field of the magnet 52A. The element 56B detects the magnetic field of the magnet 52B. The element 56B detects a reference angular position of one of the cranks 42 with respect to the frame 12.

The first detector 54 further comprises a first rotational speed calculation unit 58. The first rotational speed calculation unit 58 includes a processor that calculates the rotational speed of the cranks 42 per unit of time (hereinafter referred to as the "first rotational speed NA") from the output of the elements 56A and 56B. The first detector 54 outputs a first signal S1 comprising information that represents the first rotational speed NA to the control device 70. The element 56A outputs a signal in which one cycle is the angle obtained by dividing 360° by the number of magnetic poles with the same polarity when the crankshaft makes one rotation. The element 56B outputs a signal in which one cycle is one rotation of the crankshaft 40.

The element 56B outputs a value corresponding to the rotational angle of the one of the cranks 42 (refer to FIG. 1). The minimum angle of one of the cranks 42 (refer to FIG. 1) that can be detected by the first detector 54 is less than or equal to 180 degrees, preferably fifteen degrees, and more preferably six degrees.

The second detection device 28 detects the rotation of the front wheel 16, which is the wheel on the front side (refer to FIG. 1). The second detection device 28 comprises a magnet 60 that is attached to one of the spokes 16A of the front wheel 16 and a second detector 62 that is attached to a front fork 12A of the frame 12. The magnet 60 can be attached to one of the spokes 18B of the rear wheel 18. In this case, the second detector 62 is attached to a chain stay of the frame 12. The second detector 62 is fixed to the frame 12 by a bolt and nut, a band, etc. In the description below, the second detector 62 is configured to detect the rotation of the front wheel 16, but a case in which the second detector 62 detects the rotation of the rear wheel 18, only replacing the front wheel 16 with the rear wheel 18, is possible; therefore, the description thereof will be omitted.

The second detector 62 is electrically connected to the control device 70 by a cable that is not diagrammed. The second detector 62 transmits a second signal S2 to the control device 70 in response to the rotation of the front wheel 16. The second detector 62 is a so-called vehicle speed sensor. The second detector 62 comprises an element 64 and a vehicle speed calculation unit 66. The element 64 outputs a value corresponding to changes in the relative position with the magnet 60. The vehicle speed calculation unit 66 includes a processor that calculates the travel distance per unit of time (hereinafter referred to as the "vehicle speed V") from the output of the element 64.

The element 64 outputs a signal in which one cycle is one rotation of the front wheel 16 (refer to FIG. 1). That is, the minimum angle of the front wheel 16 that can be detected by the second detector 62 is 360 degrees. The detectable minimum angle in one rotation of the cranks 42 is smaller than the detectable minimum angle in one rotation of the front wheel 16.

The vehicle speed calculation unit 66 calculates the vehicle speed V by multiplying the circumferential length (hereinafter referred to as the "circumferential length L") of the front wheel 16 (refer to FIG. 1) by the rotational speed of the front wheel 16 (refer to FIG. 1) per unit of time. The circumferential length L of the front wheel 16 is stored in advance in the memory device of the second detector 62. The second detector 62 outputs a second signal S2 comprising information related to the vehicle speed V to the control device 70. Calculating the vehicle speed V using the diameter or the radius of the front wheel 16 (refer to FIG. 1) is also possible. In this case, the diameter or the radius of the front wheel 16 (refer to FIG. 1) is stored in advance in the memory device of the second detector 62.

The gear changing state detection device 68 detects the current gear changing state of the gear shifting device 24. The gear changing state detection device 68 may be provided to the motor unit 48 or to the gear changing control apparatus 22. The gear changing state detection device 68 outputs information related to the shift position, that is, the gear ratio γ. The gear changing state detection device 68 detects the rotation angle of a prescribed portion of the electric motor or the deceleration device in the motor unit 48, the rotation angle of a prescribed position of the transmission 50, etc. The gear changing state detection device 68 is comprised of a potentiometer or a detection device comprising a magnet and a magnetic sensor that detects this magnet, etc. The gear changing state detection device 68 is electrically connected to the control device 70.

The drive force sensor 30 detects a manual drive force that is applied to one of the cranks 42 (refer to FIG. 1). The drive force sensor 30 outputs a third signal S3 that includes a signal corresponding to the manual drive force. The drive force sensor 30 can be provided between the crankshaft 40 shown in FIG. 1 to the front sprocket 34, the crankshaft 40, the front sprocket 34, the cranks 42, or the pedals 44. The drive force sensor 30 may be realized using, for example, a strain sensor, a magnetostrictive sensor, an optical sensor, or a pressure sensor, and any sensor may be employed as long as the sensor outputs a signal corresponding to the manual drive force that is applied to the cranks 42 or the pedal s44.

As shown in FIG. 2, the control device 70 comprises a second rotational speed calculation unit 72, a rotational speed comparing unit 74, a drive force calculation unit 76, a selection value setting unit 78, a gear shift determination unit 80, and a motor controller 82. The control device 70 is formed comprising an arithmetic processor such as a CPU and a memory device to which software is stored and is configured to realize a plurality of functions. The second rotational speed calculation unit 72, the rotational speed comparing unit 74, the drive force calculation unit 76, the selection value setting unit 78, the gear shift determination unit 80, and the motor controller 82 represent the functions of the control device 70. The control device 70 can comprise a plurality of arithmetic processors and a plurality of microcomputers. The second signal S2 is input to the second rotational speed calculation unit 72. The first signal S1 is input to the rotational speed comparing unit 74 and the selection value setting unit 78.

The second rotational speed calculation unit 72 estimates the second rotational speed NB of one of the cranks 42 based on the second signal S2 from the second detector 62, information related to the circumferential length L of the front wheel 16 (refer to FIG. 1), and the gear ratio γ at that time. Specifically, the second rotational speed calculation unit 72 calculates the second rotational speed NB by dividing the vehicle speed V that is included in the second signal S2 by the circumferential length of the front wheel 16 and the gear ratio γ. The second rotational speed calculation unit 72 outputs the second rotational speed NB to the rotational speed comparing unit 74. The relationship between the gear ratio γ and the detection results of the gear changing state detection device 68 is set in advance, and such a relationship is stored in the memory. The second rotational speed calculation unit 72 performs a calculation using the corresponding gear ratio γ or obtains the gear ratio γ by using a function from the detection results of the gear changing state detection device 68.

The rotational speed of the front wheel 16 (refer to FIG. 1) may be greater than a value obtained by multiplying the gear ratio by the rotational speed of the cranks 42. For example, there are cases in which the front wheel 16 is rotating even when the cranks 42 are stopped, such as when traveling downhill. For this reason, there are cases when the second rotational speed NB that is calculated based on the output of the second detector 62 is a value that is greater than the first rotational speed NA. Additionally, since the detectable minimum angle in one rotation of the front wheel 16 is larger than the detectable minimum angle in one rotation of the cranks 42, there are cases in which a delay occurs in the calculation of the second rotational speed NB, and the calculated second rotational speed NB is a value that is greater than the first rotational speed NA. The second rotational speed NB corresponds to the rotational speed of the cranks 42 when the cranks 42 and the front wheel 16 are rotating in sync, that is, to the maximum rotational speed of the cranks 42.

The rotational speed comparing unit 74 compares the first rotational speed NA that is represented by information included in the first signal S1 and the second rotational speed NB that is represented by information included in a signal output from the second rotational speed calculation unit 72. The rotational speed comparing unit 74 outputs either the first rotational speed NA or the second rotational speed NB, based on which is greater, to the selection value setting unit 78. The drive force calculation unit 76 calculates the manual drive force T based on the third signal S3 from the drive force sensor 30 and outputs the manual drive force T to the selection value setting unit 78. The first rotational speed NA and the second rotational speed NB are input to the selection value setting unit 78. The selection value setting unit 78 sets the first rotational speed NA or the second rotational speed NB as the selection value N, based on the comparison results of the rotational speed comparing unit 74 and the manual drive force T or based only on the comparison results of the rotational speed comparing unit 74, and outputs the selection value N to the gear shift determination unit 80.

The control device 70 switches between a first control state for controlling the transmission 50 based on the first signal S1 and the second control state for controlling the transmission 50 based on the second signal S2. The control device 70 switches between the first control state and the second control state based on the first rotational speed NA, the second rotational speed NB, and the manual drive force T.

The switching operation of the control state by the control device 70 will be described with reference to FIG. 3.

In step S11, the second rotational speed calculation unit 72 calculates the second rotational speed NB based on the vehicle speed V. Next, in step S12, the selection value setting unit 78 compares the first rotational speed NA and the second rotational speed NB, proceeds to step S13 when the first rotational speed NA is greater than or equal to the second rotational speed NB, and sets the first rotational speed NA to the selection value N. When the first rotational speed NA is set to the selection value N in the previous switching operation, the selection value N is maintained at the first rotational speed NA. When the second rotational speed NB is set to the selection value N in the previous switching operation, the selection value N is changed from the second rotational speed NB to the first rotational speed NA, and the control state is switched from the second control state to the first control state.

If the second rotational speed NB is greater than the first rotational speed NA in step S12, the selection value setting unit 78 returns to step S14 and determines whether or not the manual drive force T is greater than or equal to a prescribed value TX. When the manual drive force T is greater than or equal to the prescribed value TX, the operation proceeds to step S15 and sets the first rotational speed NA to the selection value N. When the first rotational speed NA is set to the selection value N in the previous switching operation, the selection value N is maintained at the first rotational speed NA. When the second rotational speed NB is set to the selection value N in the previous switching operation, the selection value N is changed from the second rotational speed NB to the first rotational speed NA, and the control state is switched from the first control state to the second control state.

When the manual drive force T is less than the prescribed value TX in step S14, the selection value setting unit 78 proceeds to step S16 and sets the second rotational speed NB to the selection value N. When the second rotational speed NB is set to the selection value N in the previous switching operation, the selection value N is maintained at the second rotational speed NB. When the first rotational speed NA is set to the selection value N in the previous switching operation, the selection value N is changed from the first rotational speed NA to the second rotational speed NB, and the control state is switched from the second control state to the first control state. For example, a value between 1 Nm-3 Nm is selected as the prescribed value TX.

The gear shift determination unit 80 shown in FIG. 2 outputs an upshift signal or a downshift signal to the motor controller 82 based on the selection value N that is set in the selection value setting unit 78. The gear shift determination unit 80 can read a first determination value NX and a second determination value NY stored in a storage unit 84 (i.e., a memory device). The first determination value NX and the second determination value NY are threshold values. The gear shift determination unit 80 outputs an upshift signal when the selection value N is greater than or equal to the first determination value NX and outputs a downshift signal when the selection value N is less than or equal to the second determination value NY. Preferably, a value that is greater than or equal to the second determination value NY is selected as the first determination value NX. For example, 65 rpm-70 rpm is selected as the first determination value NX, and, for example, a value between 60 rpm-65 rpm is selected as the second determination value.

The first determination value NX and the second determination value NY are set as values at which the transmission 50 is controlled so that the selection value N will be a prescribed crank rotational speed or a crank rotational speed within a prescribed range. In other words, the gear shift determination unit 80 controls the transmission 50 so that the first rotational speed NA will be a prescribed crank rotational speed or a crank rotational speed within a prescribed range when controlling the transmission 50 based on the first signal S1. Additionally, the gear shift determination unit 80 controls the transmission 50 so that the second rotational speed NB will be a prescribed crank rotational speed or a crank rotational speed within a prescribed range when controlling the transmission 50 based on the second signal S2.

Figure 4:
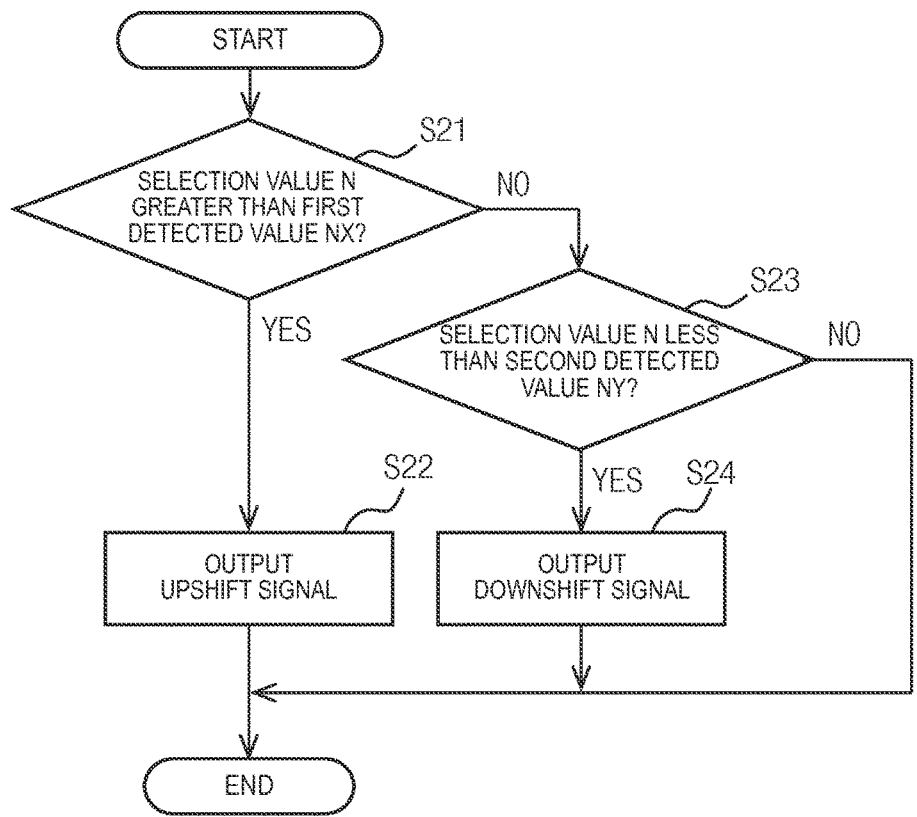
FIG. 4 is a flowchart of a shifting operation that is executed by the bicycle transmission control device illustrated in FIG. 2.

The procedure for the shifting operation that is executed by the gear shift determination unit 80 will be described with reference to FIG. 4. The gear shift determination unit 80 determines whether or not the selection value N is greater than the first determination value NX in step S21. When the selection value N is greater than the first determination value NX, the gear shift determination unit generates an upshift signal and outputs this to the motor controller 82 in step S22.

When the selection value N is less than the first determination value NX in step S21, the gear shift determination unit 80 determines whether or not the selection value N is less than or equal to the second determination value NY in step S23. When the selection value N is less than or equal to the second determination value NY, the gear shift determination unit 80 generates a downshift signal and outputs this to the motor controller 82 in step S24.

When the selection value N is greater than the second determination value NY in step S23, the gear shift determination unit 80 does not output an upshift signal or a downshift signal to the motor controller 82.

The motor controller 82 shown in FIG. 2 controls the motor unit 48 based on a signal output from the gear shift determination unit 80 or a signal that is input from the gear changing control apparatus 22. The motor controller 82 outputs a control signal SA for shifting the shift position of the gear changing device 24 up to the drive circuit (diagram omitted) of the motor unit 48 when an upshift signal is input. The motor controller 82 outputs a control signal SA for shifting the shift position of the gear changing device 24 down to the drive circuit (diagram omitted) of the motor unit 48 when a downshift signal is input. When an upshift signal is input at the time of the maximum gear ratio γ, and when a downshift signal is input at the time of the minimum gear ratio γ, the motor controller 82 will not drive the motor unit 48.

The action and effects of the control device 70 will be described.

(1) The minimum angle of the cranks 42 that can be detected by the first detector 54 is smaller than the minimum angle of the front wheel 16 that can be detected by the second detector 62. That is, the first rotational speed NA that is calculated according to the output of the first detector 54 is more accurate than the second rotational speed NB that is calculated according to the output of the second detector 62. For this reason, more appropriately changing the transmission 50 than when controlling the transmission 50, based on the second rotational speed NB, is possible by controlling the transmission 50 based on the first rotational speed NA.

If the transmission 50 is controlled based only on the first rotational speed NA, for example, when the rotation of the cranks 42 is stopped while the bicycle 10 is traveling, the transmission wilt be controlled to downshift so that the gear ratio γ will be decreased. In this case, a situation arises immediately after the rider restarts the rotation of the cranks 42 in which the manual drive force is not immediately transmitted to the wheels due to the gear ratio γ being too small, and having the rotational speed of the cranks 42 fit within the prescribed range becomes difficult.

The control device 70 is configured to automatically switch between a first control state for controlling the transmission 50 based on the first signal S1 and the second control state for controlling the transmission 50 based on the second signal S2. For this reason, controlling the gear ratio γ based on signals S1 and S2 that are suitable as traveling situations, etc., of the bicycle 10 is possible. As a result, changing the gear ratio γ at an appropriate time is possible.

(2) For example, the accuracy of the second rotational speed NB that is calculated according to the output of the second detector 62 is less accurate than the first rotational speed NA that is calculated according to the output of the first detector 54. For this reason, there are cases in which the second rotational speed NB becomes greater than the first rotational speed NA even when the crank 42 and the front wheel 16 are actually rotating in sync, especially when the vehicle speed is suddenly increased or decreased.

When controlling the gear shifting device 24 only by comparing the second rotational speed NB and the first rotational speed NA, there are cases in which the gear ratio γ becomes large by gear shifting based on the second rotational speed NB, even if the crank 42 and the front wheel 16 are actually rotating in sync.

The control device 70 controls the transmission 50 based on the first rotational speed NA when the manual drive force T is greater than or equal to a prescribed value TX, even if the second rotational speed NB is greater than the first rotational speed NA. For this reason, controlling the bicycle according to the load of the rider is possible, and preventing an inappropriate gear ratio γ is possible even if the vehicle speed changes rapidly.

Second Embodiment

Figure 5:
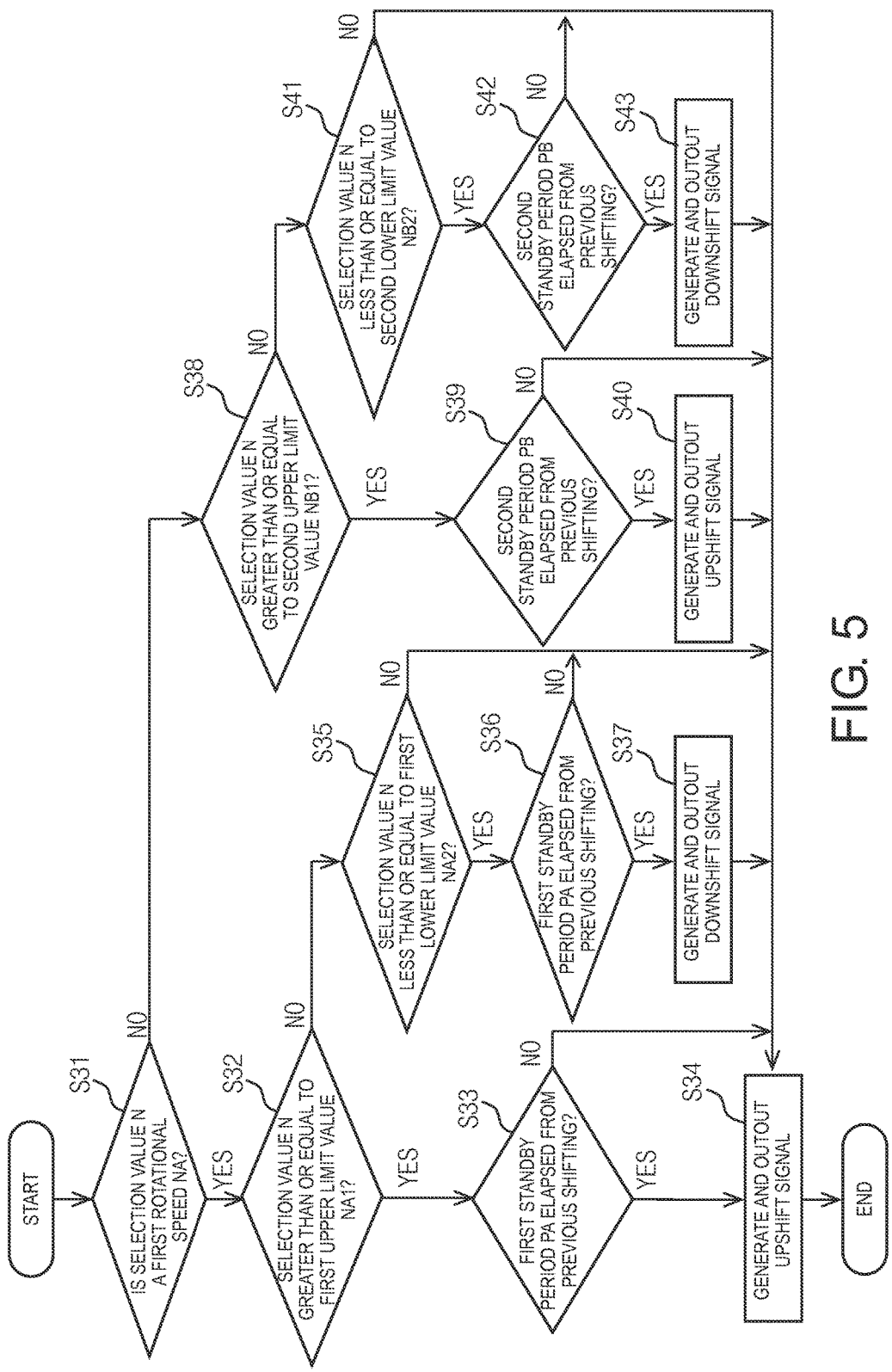
FIG. 5 is a flowchart of a shifting operation that is executed by the bicycle transmission control device in accordance with a second embodiment.

The configuration of a control device 70 according to the second embodiment is explained with reference to FIG. 5. The control device 70 of the second embodiment executes a shifting operation shown in FIG. 5, instead of a shifting operation of the first embodiment shown in FIG. 4. The shifting operation shown in FIG. 5 is repeated until powering off. Also, the storage unit 84 (refer to FIG. 2) stores a first upper limit value NA1, a first lower limit value NA2, a second upper limit value NB1, a second lower limit value NB2, and a table related to a first standby period PA and a second standby period PB, instead of the determination value NX, NY. The first upper limit value NA1, the first lower limit value NA2, the second upper limit value NB1, the second tower limit value NB2, the first standby period PA, and the second standby period PB are threshold values. The common configurations with the first embodiment are indicated with the same reference symbols as in the first embodiment and their descriptions will be omitted.

The procedure of the shifting operation executed by a gear shift determination unit 80 is explained.

The gear shift determination unit 80 determines whether or not a selection value N selected by a selection value setting unit 78 in step S31 is a first rotational speed NA.

When the selection value N is the first rotational speed NA, the gear shift determination unit 80 determines whether or not the selection value N is greater than or equal to the first upper limit value NA1 in step S31. When the selection value N is greater than or equal to the first upper limit value NA1, the gear shift determination unit 80 determines whether or not the first standby period PA has elapsed from a previous shifting in step S33. The previous shifting is when either an upshift signal or a downshift signal was output to a transmission 50 the last time. When the control device 70 outputs an upshift signal and a downshift signal to the transmission 50, the control device 70 counts up elapsed time from this moment.

When the first standby period PA has elapsed from the previous shifting, the gear shift determination unit 80 generates an upshift signal and outputs this to a motor controller 82 in step S34. When the first standby period PA has not elapsed in step S33, the gear shift determination unit 80 does not output an upshift signal or a downshift signal to the motor controller 82.

When the selection value N is less than the first upper limit value NA1 in step S32, the gear shift determination unit 80 determines whether or not the selection value N is less than or equal to the first lower limit value NA2 in step S35. When the selection value N is greater than the first lower limit value NA2 in step S35, the gear shift determination unit 80 does not output an upshift signal or a downshift signal to the motor controller 82. That is, when the first rotational speed NA is less than the first upper limit value NA1 and greater than the first lower limit value NA2 in a first control state, the gear shift determination unit 80 does not output an upshift signal or a downshift signal to the motor controller 87.

When the selection value N is less than or equal to the first tower limit value NA2 in step S35, the gear shift determination unit 80 determines whether or not the first standby period PA has elapsed from the previous shifting in step S36.

When the first standby period PA has elapsed from the previous shifting, the gear shift determination unit 80 generates a downshift signal and outputs this to the motor controller 82 in step S37. When the first standby period PA has not elapsed in step S36, the gear shift determination unit 80 does not output an upshift signal or a downshift signal to the motor controller 82.

That is, the control device 70 operates the transmission 50 on that the gear ratio γ becomes greater when the transmission 50 is controlled based on a first signal and when the first rotational speed NA, which is a rotational speed of a crank 32, is greater than or equal to the first upper limit value NA1, and operates the transmission so that the gear ratio γ becomes smaller when the transmission 50 is controlled based on the first signal and when the first rotational speed NA is less than or equal to the first lower limit value.

Also, the control device 70 does not operate the transmission 50 when the rotational speed of the crank reaches a range below the first upper limit value NA1 and above the first lower limit value NA2 during a period from when the first rotational speed NA is greater than or equal to the first upper limit value NA1 or less than or equal to the first lower limit value NA2 until when the first standby period PA elapses, when the transmission 50 is controlled based on the first signal.

When the selection value N is a second rotational speed NB in step S31, the gear shift determination unit 80 determines whether or not the selection value N is greater than or equal to the second upper limit value NB1 in step S38. When the selection value N is greater than or equal to the second upper limit value NB1, the gear shift determination unit 80 determines whether or not the second standby period PB has elapsed from the previous shifting in step S39. When the second standby period PB has elapsed, the gear shift determination unit 80 generates an upshift signal and outputs this to the motor controller 82 in step S40. When the second standby period PB has not elapsed in step S39, the gear shift determination unit 80 does not output an upshift signal or a downshift to the motor controller 82.

When the selection value N is less than the second upper limit value NB1 in step S38, the gear shift determination unit 80 determines whether or not the selection value N is less than or equal to the second lower limit value NB2 in step S41. When the selection value N is greater than the second lower limit value NB2 in step S42, the gear shift determination unit 80 does not output an upshift signal or a downshift signal to the motor controller 82. That is, when the second rotational speed NB is less than the second upper limit value NB1 and greater than the second lower limit value NB2 in a second control state, the gear shift determination unit 80 does not output an upshift signal or a downshift signal to the motor controller 82.

When the selection value N is less than or equal to the second lower limit value NB2 in step S41, the gear shift determination unit 80 determines whether or not the second standby period PB has elapsed from the previous shifting in step S36. When the second standby period PB has elapsed, the gear shift determination unit 80 generates a downshift signal and outputs this to the motor controller 82 in step S43. When the second standby period PB has not elapsed in step S43, the gear shift determination unit 80 does not output upshift signal or a downshift signal to the motor controller 82.

That is, the control device 70 operates the transmission 50 so that the gear ratio γ becomes greater when the transmission 50 is controlled based on the second signal and when the second rotational speed NB is greater than or equal to the second upper limit value NB1, and operates the transmission 50 so that the gear ratio γ becomes smaller when the transmission 50 is controlled based on the second signal and when the second rotational speed NB is less than or equal to the second lower limit value NB2.

Also, the control device 70 does not change the gear ratio γ when the rotational speed of the crank reaches a range below the second upper limit value NB1 and above the second lower limit value NA2 during a period from when the second rotational speed NB is greater than or equal to the second upper limit value NB1 or less than or equal to the second lower limit value NB2 until when the second standby period PB elapses, when the transmission is controlled based on the second signal.

The storage unit 84 stores the first upper limit value NA1, the first lower limit value NA2, the second upper limit value NB1, and the second lower limit value NB2. The second upper limit value NB1 is less than the first upper limit value NA1. The second lower limit value NB2 is greater than the first lower limit value NA2. Preferably, a range between the second upper limit value NB1 and the second lower limit value NB2 is 25-50% of a range between the first upper limit value NA1 and the first lower limit value NA2. For example, the first upper limit value NA1 is 70 rpm, the first lower limit value NA2 is 50 rpm, the second upper limit value NB1 is 67.5 rpm, and the second lower limit value NB2 is 52.5 rpm.

The storage unit 84 stores the table related to the first standby period PA and the second standby period PB. The first standby period PA and the second standby period PB are set based on a control state, a magnitude of a travel load R, and a previous shifting operation. The travel load R is calculated based on at least one of a manual drive force that is applied to a pedal 44, a bicycle speed of a bicycle 10, and a rotational speed of the crank 32. The travel load R is obtained, for example, by subtracting a changed kinetic energy of the bicycle from an input energy. The input energy is obtained by integrating a torque on the crank caused by the manual drive force applied to the pedal 44 and the rotational speed of the crank. The changed kinetic energy of the bicycle is obtained from a weight of the bicycle and a rider and the bicycle speed of the bicycle. The changed kinetic energy of the bicycle is obtained, for example, from $1/2\ m(v2-V1)^2$. The bicycle speed of the bicycle 10 can use the first rotational speed NA. The rotational speed of the crank 32 can use the second rotational speed NB. The travel load R comprises a first travel load RA and a second travel load RB. The first travel load RA is, for example, a relatively small travel load R such as when the bicycle 10 travels downhill. The second travel load RB is, for example, a relatively big travel load R such as when the bicycle 10 travels uphill. The second travel load RB is greater than the first travel load RA.

Table 1 shows a control state, a first travel load RA, and a previous shifting operation, and a relation table between a first standby period PA and a second standby period PB when an upshift condition is met. The upshift condition is met when the first rotational speed NA is greater than the upper limit value NA1 in the first control state and when the second rotational speed NB is greater than the upper limit value NB1 in the second control state.

PB holds a relationship of PBmax>PBmid>PBmin. The maximum period PBmax can be equal to or different from the maximum period PAmax. The intermediate period PBmid can be equal to or different from the intermediate period PAmid. The minimum period PBmin can be equal to or different from the minimum period PAmin. The maximum period PAmax, PBmax is, for example, 1000 milliseconds. The intermediate period PAmid, PBmid is, for example, a period which is half of the maximum period PAmax, PBmax and is 500 milliseconds. The minimum period PAmin, PBmin is, for example, a period which is half of the intermediate period PAmid, PBmid and is 250 milliseconds.

When the upshift condition is met during the previous shifting operation which is upshifting and when the travel load R is greater than or equal to the first travel load RA, the control device 70 sets the first standby period PA or the second standby period PB to the maximum period PAmax or the maximum period PBmax. In other words, the control device 70 sets a period in which upshifting is prohibited to be longer when the travel load R is big, such as when the bicycle 10 performs downshifting while travelling on a flat road, than when the travel load R is small, such as when the bicycle 10 travels downhill.

Table 2 shows a control state, a second travel load RB, and a previous shifting operation, and a relation table between a first standby period PA and a second standby

TABLE 1

First Standby Period PA and Second Standby Period PB When Upshift Condition is Met

| | | Travel Load R | | | |
|---|---|---|---|---|---|
| | | Greater than or Equal to First Travel Load RA | | Less than First Travel Load RA | |
| | | Control State | | | |
| | | First Control State | Second Control State | First Control State | Second Control State |
| Previous Shifting Operation | Up-shift | PAmid | PBmin | PAmid | PBmin |
| | Down-shift | PAmax | PBmax | PAmid | PBmin |

A maximum period PA max, an intermediate period PAmid, and a minimum period PAmin of the first standby period PA holds a relationship of PAmax>PAmid>PAmin. A maximum period PBmax, an intermediate period PBmid, and a minimum period PBmin of the second standby period period PB when a downshift condition is met. The downshift condition is met when the first rotational speed NA is less than the lower limit value NA2 in the first control state and when the second rotational speed NB is less than the lower limit value NB2 in the second control state.

TABLE 2

First Standby Period PA and Second Standby
Period PB When Downshift Condition is Met

| | | Travel Load R | | | |
|---|---|---|---|---|---|
| | | Less than Second Travel Load RB | | Greater than or Equal to Second Travel Load RB | |
| | | Control State | | | |
| | | First Control State | Second Control State | First Control State | Second Control State |
| Previous Shifting Operation | Up-shift | PAmax | PBmax | PAmid | PBmin |
| | Down-shift | PAmid | PBmin | PAmid | PBmin |

When the downshift condition is met during the previous shifting operation which is upshifting and when the travel load R is less than the second travel load RB, the control device 70 sets the first standby period PA or the second standby period PB to the maximum period PAmax or the maximum period PBmax. In other words, the control device 70 sets a period in which downshifting is prohibited to be longer when the travel load R is small, such as when the bicycle 10 performs upshifting while travelling on a flat road, than when the travel load R is big, such as after when the bicycle 10 performs upshifting while travelling uphill.

As shown in Table 1 and Table 2, the first standby period PA and the second standby period PB are set based on the previous shifting operation of the transmission 50 and the travel load R of the bicycle 10. The second standby period PB is less than or equal to the first standby period PA when the travel load R of the bicycle 10 is included in the same range.

In addition to the effects of the first embodiment described in (1) and (2), the control device 70 will provide the following effects.

(3) The second upper limit value NB1 is different from the first upper limit value NA1. For this reason, the control device 70 can change the gear ratio γ using the upper limit value NA1, NB1 which is suitable to each of the first control state and the second control state.

(4) The second lower limit value NB2 is different from the first lower limit value NA2. For this reason, the control device 70 can change the gear ratio γ using the lower limit value NA2, NB2 which is suitable to each of the first control state and the second control state.

(5) The second upper limit value NB1 is less than the first upper limit value NA1. Also, the second lower limit value NB2 is greater than the first lower limit value NA2. That is, a range between the second upper limit value NB1 and the second lower limit value NB2 is smaller than a range between the first upper limit value NA1 and the first lower limit value NA2. For this reason, shifting is facilitated in the second control state, or specifically, when the rider stops and does not rotate the crank 32 or when the torque applied to the crank 32 is small such as when the first rotational speed NA is less than the second rotational speed NB. As a result, the rider hardly feels a sense of incongruity due to a shifting operation of the transmission 50, compared with when shifting is performed white a torque applied to the crank 32 is big. Moreover, since a shifting operation is facilitated when a torque applied to the crank 32 is small, a frequency of a shifting operation failure due to a torque applied to the crank 32 being big can be lowered.

(6) When the gear ratio γ becomes greater, the rotational speed of the crank 32 tends to become smaller. For this reason, the downshift condition tends to be met immediately after the gear ratio γ becomes greater. Also, when the gear ratio γ becomes smaller, the rotational speed of the crank 32 tends to become greater. For this reason, the upshift condition tends to be met immediately after the gear ratio γ becomes smaller. When the upshift condition or the downshift condition is met, the control device 70 does not change the gear ratio γ until after the first standby period PA or the second standby period PB has elapsed from the previous shifting operation. As a result, repeated shifting operations within a short period of time can be prevented.

(7) The control device 70 sets the standby period PA, PB when the upshift condition is met to be smaller than the standby period PA, PB when the previous shifting operation is upshifting and when the downshift condition is met while the travel load R is greater than or equal to the first travel load RA. For this reason, upshifting is facilitated in a state in which the travel load R, is small, such as on downhill. As a result, the rider hardly feels a sense of incongruity due to a shifting operation of the transmission 50 and a frequency of a shifting operation failure can be lowered.

(8) The control device 70 sets the standby period PA, PB when the downshift condition is met to be smaller than the standby period PA, PB when the previous shifting operation is downshifting and when the upshift condition is met while the travel load R is less than the second travel load RB. For this reason, downshifting is facilitated in a state in which the travel load R is big, such as on uphill.

(9) When the travel load R is included in the same range, the second standby period PB is less than or equal to the first standby period PA. For this reason, shifting is facilitated in the second control state in which the second rotational speed NB is greater than the first rotational speed NA.

MODIFIED EXAMPLES

The specific form that the present control device can take is not limited to the forms illustrated in each of the above-described embodiments. The present control device can take various forms that are different from each of the above-described embodiments. The modified example of each of the above-described embodiments explained below is one example of the various forms that the present control device can take.

Figure 6:
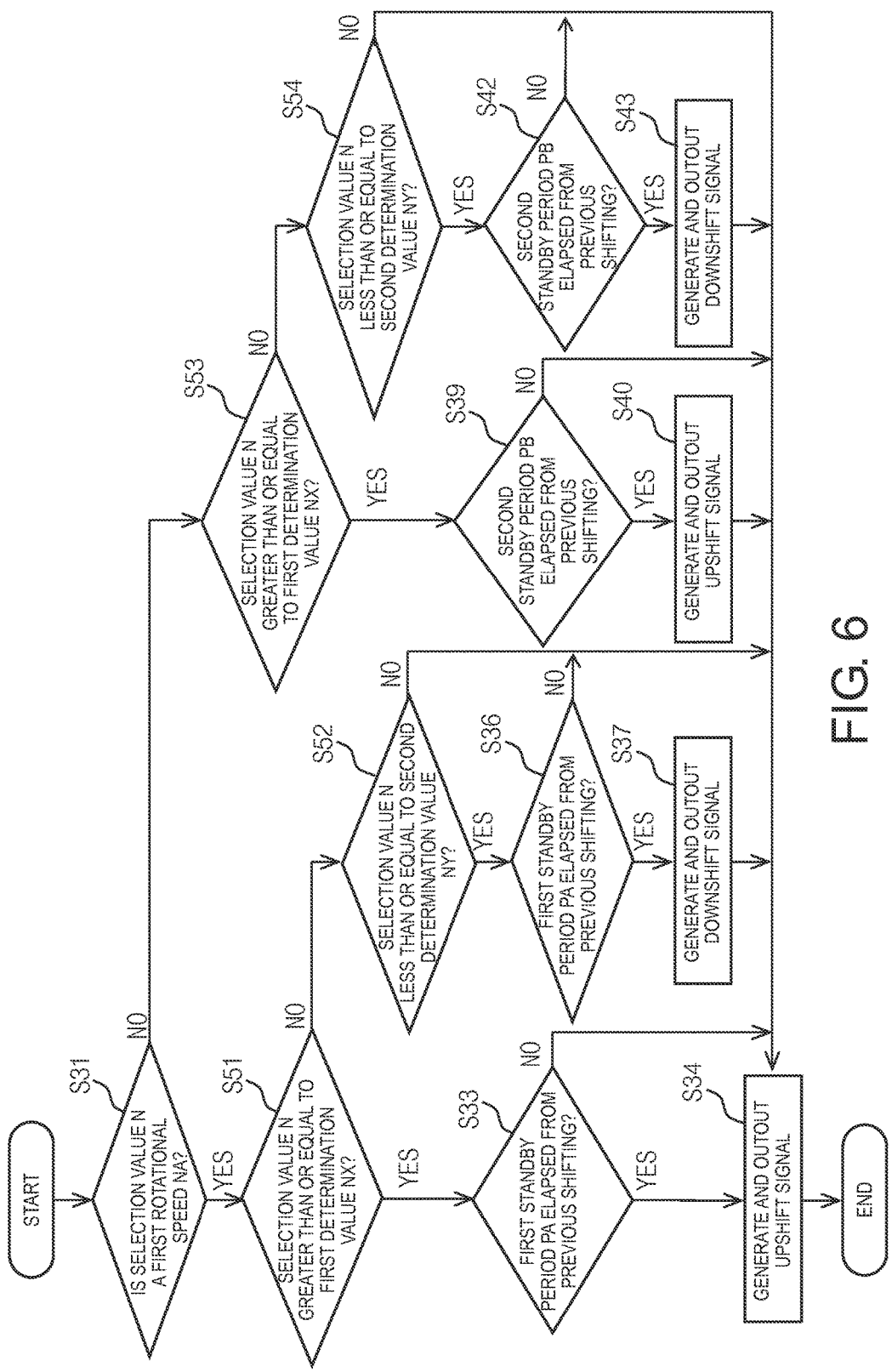
FIG. 6 is a flowchart of a shifting operation that is executed by the bicycle transmission control device in accordance with a first modified example of the second embodiment.

Changing the shifting operation of the second embodiment to the operation shown in FIG. 6 is also possible. In this modified example, the storage unit 84 stores the first determination value NX and the second determination value NY.

The gear shift determination unit 80 executes the operation of step S51 to determine whether or not the selection value N is greater than or equal to the first determination value NX, instead of the operation of step S32. The gear shift determination unit 80 executes the operation of step S54 to determine whether or not the selection value N is greater than or equal to the first determination value NX, instead of the operation of step S38. Also, the gear shift determination unit 80 executes the operation of step S52 to determine whether or not the selection value N is less than or equal to the second determination value NY, instead of the operation of step S35. The gear shift determination unit 80 executes the operation of step S54 to determine whether or not the selection value N is less than or equal to the second determination value NY, instead of the operation of step S41. The shifting operation shown in FIG. 6 is repeated until powering off. The gear shift determination unit 80 advances to step S33 when an affirmative determination is made in step S51, and advances to step S52 when a negative determination is made in step S51. The gear shift determination unit 80 advances to step S36 when an affirmative determination is made in step S52, and ends the shifting operation when a negative determination is made in step S52. The gear shift determination unit 80 advances to step S39 when an affirmative determination is made in step S53, and advances to step S54 when a negative determination is made in step S53. The gear shift determination unit 80 advances to step S42 when an affirmative determination is made in step S54, and ends the shifting operation when a negative determination is made in step S54. In the operation shown in FIG. 6, threshold values, which are shifting conditions, are not changed at the time of shifting based on the first rotational speed NA and at the time of shifting based on the second rotational speed NB.

Figure 7:
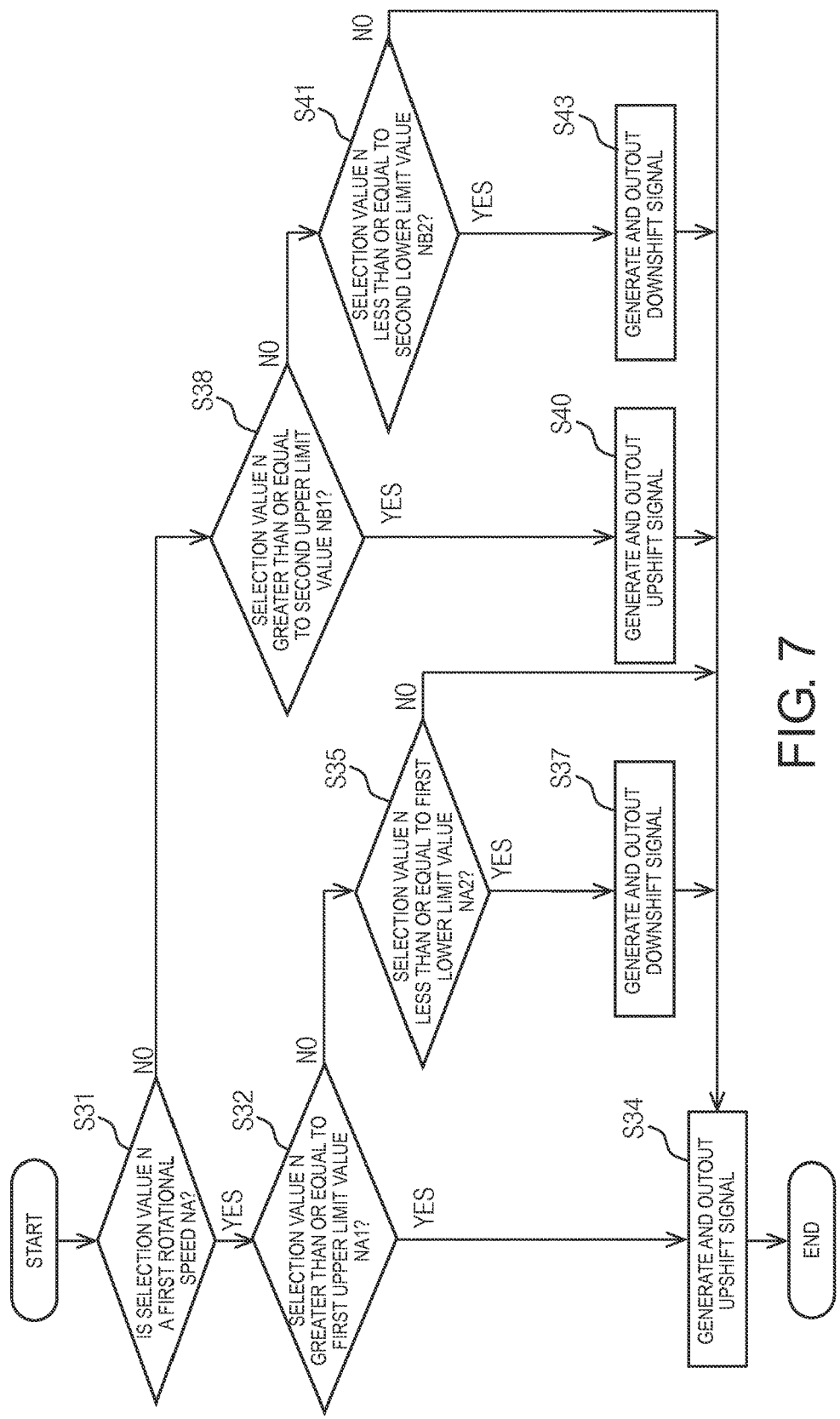
FIG. 7 is a flowchart of a shifting operation that is executed by the bicycle transmission control device in accordance with a second modified example of the second embodiment.

In the shifting operation of the second embodiment, steps S33, S36, S39 and S42 shown in FIG. 5 may be omitted. That is, as shown in FIG. 7, the control device 70 outputs an upshift signal and ends the shifting operation when the selection value N is greater than or equal to the upper limit value NA1, NB1 in step S32 and step S38. The control device 70 outputs a downshift signal and ends the shifting operation when the selection value N is greater than or equal to the lower limit value NA2, NB2 in step S35 and step S41.

In the second embodiment, the control device 70 may obtain at least one of the first upper limit value NA1, the first lower limit value NA2, the second upper limit value NB1, and the second lower limit value NB2 by calculation. For example, the storage unit 84 stores the first upper limit value NA1 and the first lower limit value NA2. In the second control state, the control device 70 sets a value obtained by multiplying a first coefficient greater than or equal to "1" by the first upper limit value NA1 to be the second upper limit value NB1, and sets a value obtained by multiplying a second coefficient less than "1" by the second lower limit value NA2 to be the second lower limit value NB2.

In the second embodiment, the first standby period PA may be a constant value regardless of the travel load R and the previous shifting operation.

In the second embodiment, the second standby period PB may be a constant value regardless of the travel load R and the previous shifting operation.

In the second embodiment, the second standby period PB may be equal to the first standby period PA.

In the second embodiment, the second standby period PB may be set to be less than or equal to the first standby period regardless of the travel load R and the previous shifting operation.

In the second embodiment, the control device 70 may obtain at least one of the first standby period PA and the second standby period PB by calculation. For example, the storage unit 84 stores the maximum period Pmax. The control device 70 calculates the first standby period PA or the second standby period PB by multiplying a correction coefficient based on the control state, the travel load R, and the previous shifting operation by the maximum period Pmax.

Figure 8:
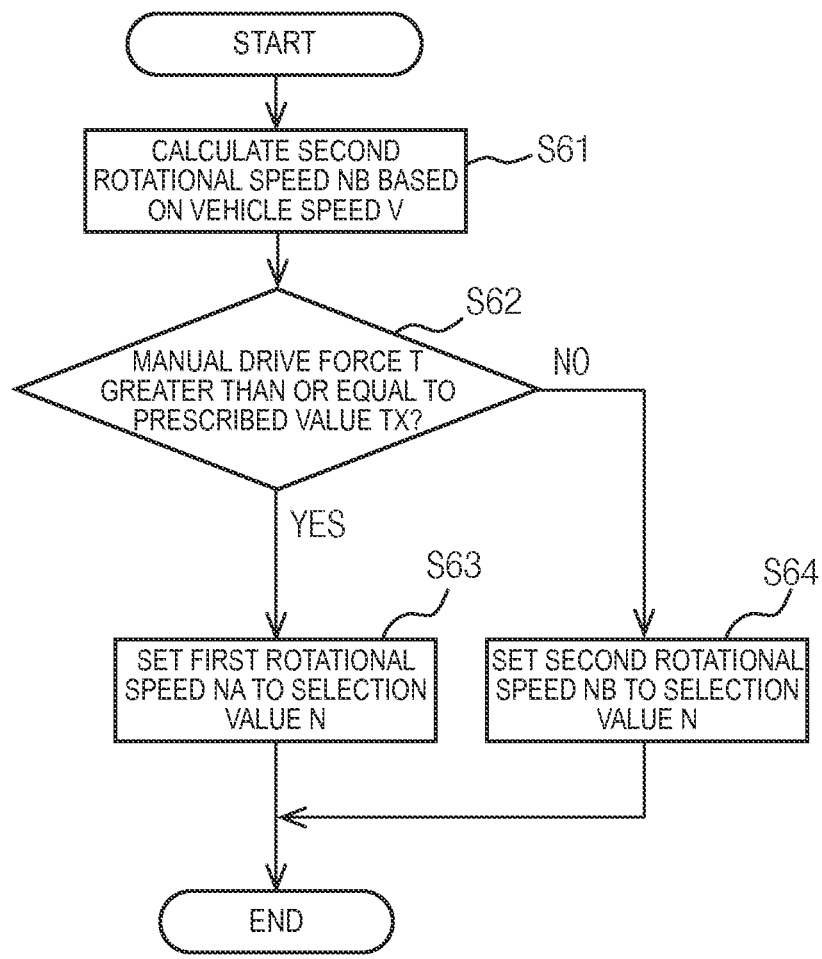
FIG. 8 is a flowchart of a switching operation that is executed by the bicycle transmission control device in accordance with a first modified example for each of the embodiments.

In each of the embodiments, it is also possible to change the switching operation to the operation shown in FIG. 8. That is, the control device 70 switches between the first control state and the second control state based on the manual drive force T. Specifically, after the second rotational speed calculation unit 72 calculates the second rotational speed NB in step S61, the selection value setting unit 78 determines whether or not the manual drive force T is greater than or equal to the prescribed value TX in step S62. When the manual drive force T is greater than or equal to the prescribed value TX, the selection value setting unit 78 proceeds to step S63 and sets the first rotational speed NA to the selection value N; when the manual drive force T is less than the prescribed value TX, the selection value setting unit 78 proceeds to step S64 and sets the second rotational speed NB to the selection value N.

Figure 3:
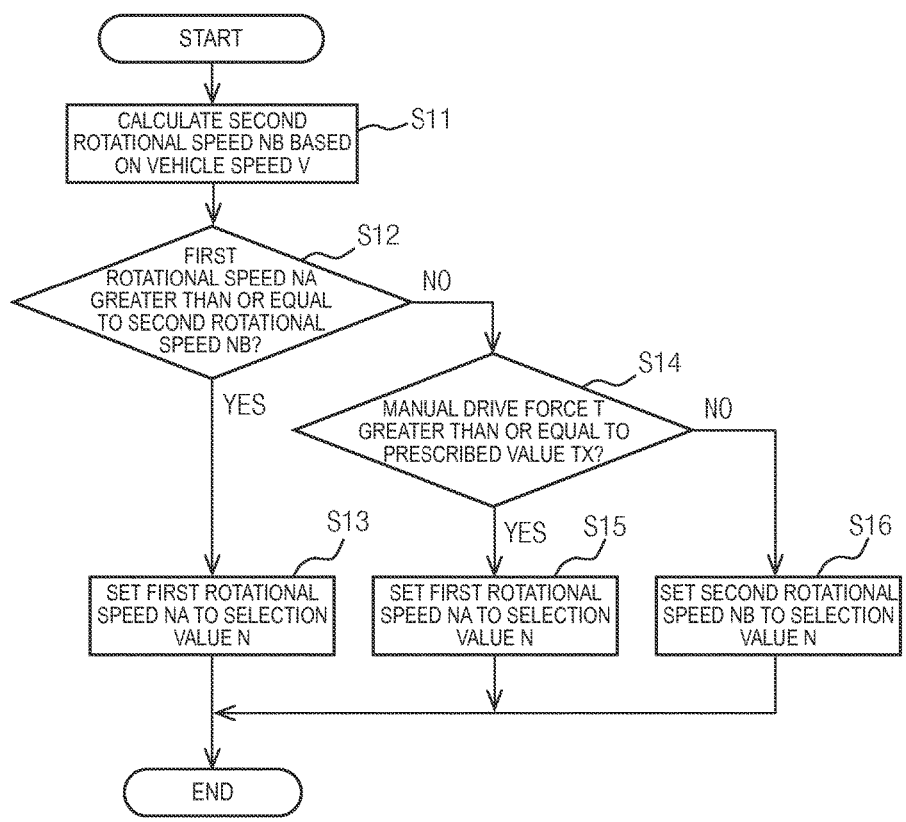
FIG. 3 is a flowchart of a switching operation that is executed by the bicycle transmission control device illustrated in FIG. 2.
Figure 9:
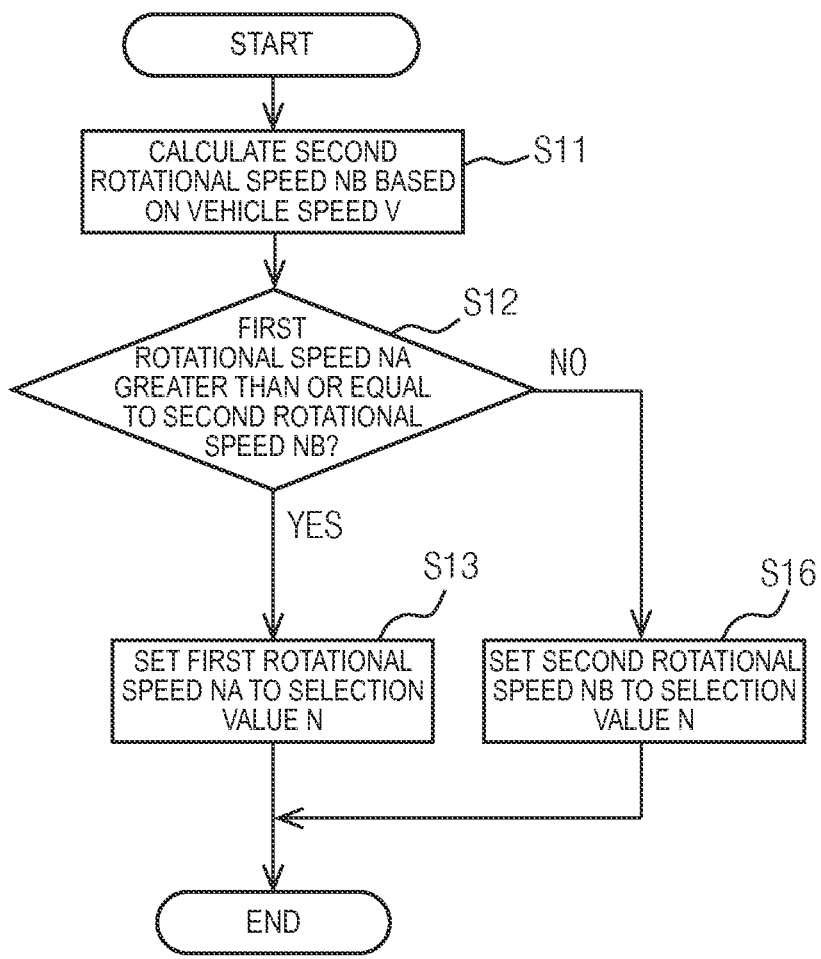
FIG. 9 is a flowchart of a switching operation that is executed by the bicycle transmission control device in accordance with a second modified example for each of the embodiments.

In the switching operations of each of the embodiments, it is also possible to omit the operations of step S14 and step S15 of the switching operation shown in FIG. 3. That is, as shown in FIG. 9, the control device 70 sets the first rotational speed NA to the selection value N when the first rotational speed NA is greater than or equal to the second rotational speed NB; the second rotational speed NB is set to the selection value N when the first rotational speed NA is less than the second rotational speed NB.

Figure 10:
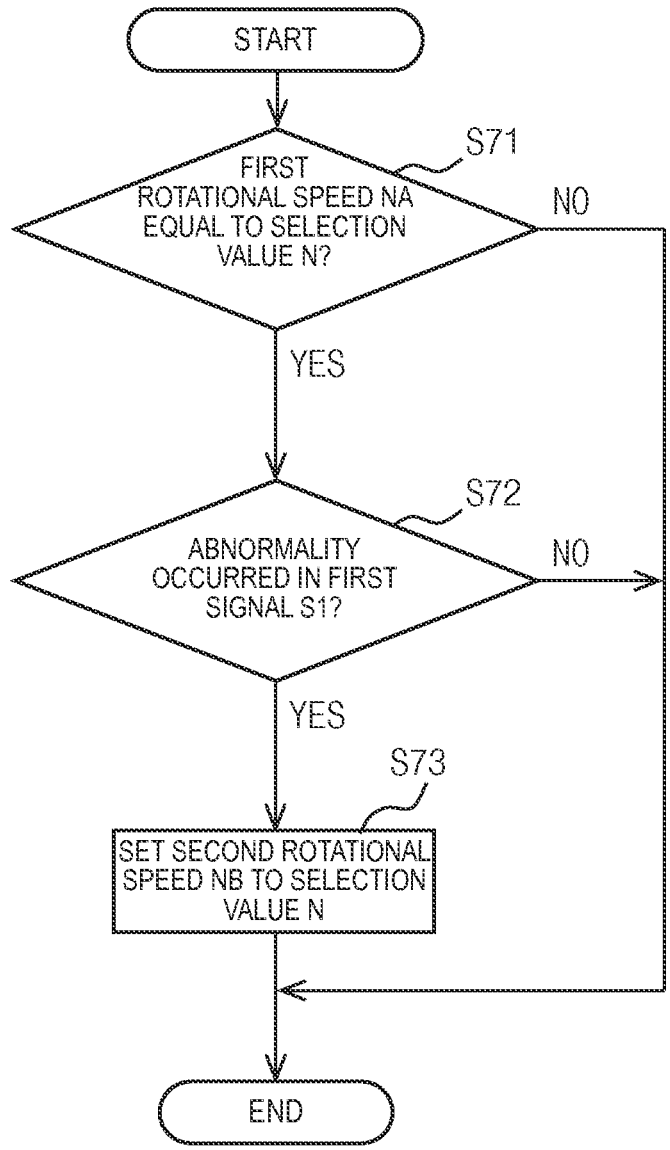
FIG. 10 is a flowchart of a switching operation that is executed by the bicycle transmission control device in accordance with a third modified example for each of the embodiments.

It is also possible to change the switching operation to the operation of the embodiments to the operation shown in FIG. 10 is also possible. The control device 70 sets the first rotational speed NA to the selection value N in the initial setting. The control device 70 determines whether or not the first rotational speed NA is the selection value N in step S71. If the first rotational speed NA is the selection value N, the control device determines whether or not an abnormality has occurred in the first signal S1 in step S72. When a determination is made that an abnormality has occurred in the first signal S1 in step S72, the control device 70 switches second rotational speed NB to the selection value N in step S73. Additionally, when a determination is made that an abnormality has not occurred in the first signal S1 in step S72, the control device 70 maintains the selection value N at the first rotational speed NA, and the present operation ends.

When a determination is made that the first rotational speed NA is not the selection value N in step S71, that is, when the second rotational speed NB is the selection value N, the control device 70 maintains the selection value N at the second rotational speed NB, and the present operation ends.

A determination is made that an abnormality has occurred in the first signal S1 when, for example, the first rotational speed NA included in the first signal S1 does not change from a constant value or when the first rotational speed NA is excessively large, even when a determination can be made based on the second signal S2 that the bicycle is in a traveling state. Examples of cases in which the first rotational speed NA does not change from a constant value even when the bicycle 10 is in a traveling state include the adhesion of contamination, such as dirt to the first detector

54, a malfunctioning of the first detector 54, the fatting of the magnets 52A and 52B from the crank 42, and a disconnection of a telegraph line (diagram omitted) that connects the first detector 54 and the control device 70. Additionally, an example of a case in which the first rotational speed NA is excessively large is a short-circuit failure inside of the first detector 54, etc.

In the modified example shown in FIG. 10, the control device 70 may set the second rotational speed NB to the selection value N in the initial setting and switch the first rotational speed NA to the selection value N when an abnormality has occurred in the second signal S2. Whether to select the second rotational speed NB or the first rotational speed NA in the initial setting may be selected by the rider. In this case, a cycle computer, a personal computer, or the like comprising an input interface may be electrically connected to the control device 70, and the initial setting may be performed via such a device.

Adding the operation of the modified example shown in FIG. 10 to the switching operation show in FIG. 3 is also possible. That is, the operations of step S51-S53 are executed after step S13 and step S15 in FIG. 3, and the above-described operation of the modified example shown in FIG. 10 is performed after step S16.

In the switching operation shown in FIG. 3, the processing order of the operations of step S12 and step S14 may be interchanged. In this case, for example, the control device 70 determines whether or not the manual drive force T is greater than or equal to a prescribed value TX in step S12; when the manual drive force T is greater than or equal to the prescribed value TX, the operation proceeds to step S13. Additionally, if the manual drive force T is less than the prescribed value TX in step S12, a determination is made regarding whether or not the first rotational speed NA is greater than or equal to the second rotational speed NB in step S14. When a determination is made that the first rotational speed NA is greater than or equal to the second rotational speed NB in step S14, the operation proceeds to step S15 and sets the first rotational speed NA to the selection value N. When a determination is made that the first rotational speed NA is less than the second rotational speed NB in step S14, the operation proceeds to step S16 and sets the second rotational speed NB to the selection value N.

In each of the embodiments, it is also possible to attach the magnet 52A of the first detection device 26 to the pedal 44.

In each of the embodiments, it is also possible to attach the first detector 54 of the first detection device 26 to the crank 32 and attaching the magnets 52A and 52B to the frame 12. In this case, the first detector 54 transmits the first signal S1 to the control device 70 by wireless communication.

In each of the embodiments, the output of the elements 56A and 56B of the first detection device 26 may be directly input to the control device 70, or they may be input to the control device 70 after amplifying the output of the elements 56A and 56B. In this case, the control device 70 comprises the function of the first rotational speed calculation unit 58, and the first rotational speed NA is calculated by the control device 70.

In each of the embodiments, it is also possible to make the element 56A of the first detection device 26 a rotational angle sensor that is attached around the crankshaft 40.

In each of the embodiments, it is possible to form at least one of the elements 56A, 56A of the first detection device 26 or the element 64 of the second detection device 28 from an optical sensor.

In each of the embodiments, it is possible to modify the configuration so that the second detection device 28 is attached to a rear wheel 18, which is a wheel on the rear side, and the magnet 60 is attached to the frame 12 in order to detect the rotation of the rear wheel 18. In this case, the second detector 62 transmits the first signal S1 to the control device 70 by wireless communication.

In each of the embodiments, the output of the element 64 of the second detection device 28 may be directly input to the control device 70, or this may be input to the control device 70 after amplifying the output of the element 64. In this case, the control device 70 comprises the function of the vehicle speed calculation unit 66, and the control device 70 calculates the second rotational speed NB.

In each of the embodiments, a hub dynamo may be used instead of the magnet 60 and the element 64 of the second detection device 28. A hub dynamo outputs a periodic signal or a pulse signal every prescribed rotational angle of the front wheel 16 to the vehicle speed calculation unit 66.

In each of the embodiments, it is possible to form the second detection device 28 of each of the embodiments from a GPS (Global Positioning System) receiver. In this case, the second detection device 28 or the control device 70 calculates the second rotational speed NB based on the travel distance per unit of time of the bicycle 10, information related to the circumferential length L of the front wheel 16, and the gear ratio γ at that time.

In each of the embodiments, it is possible to making the minimum angle of the front wheel 16 that can be detected by the second detector 62 of each of the embodiments less than or equal to the minimum angle of the crank 32 that can be detected by the first detector 54. In this case, for example, the first detector 54 does not comprise a magnet 52B or the element 56B and has a configuration to detect the position of the magnet 52A just once per one rotation of the crank; also, the second detector 62 is formed comprising a hub dynamo. In this modified example, the accuracy of the rotational speed that is calculated according to the output of the second detector 62 is higher than the accuracy of the rotational speed that is calculated according to the output of the first detector 54. In this case, the control device 70 may perform the switching operation described above by making the rotational speed that is calculated according to the output of the second detector 62 the first rotational speed NA and by making the rotational speed that is calculated according to the output of the first detector 54 the second rotational speed NB.

In each of the embodiments, it is possible to provide a storage unit to which is input a control signal SA that is output from the motor controller 82 to the control device 70, and to detect the gear ratio γ based on the control signal SA that is stored in the storage unit.

In each of the embodiments, it is also possible to change the gear shifting device 24 to an electric external gear shifting device. The electric external gear shifting device may comprise a front external transmission and a rear external transmission. Additionally, the gear changing device 24 may be changed to be attached to the crankshaft 40. In short, any gear shifting device may be employed as long as the gear shifting device is configured to change the gear ratio γ with a control device 70.

White only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle transmission control device comprising:
a transmission controller programmed to automatically switch between a first control state and a second control state for controlling a transmission, the first control state for controlling the transmission in accordance with a first signal that is input from a first detector that detects a rotation of a crank, the second control state for controlling the transmission in accordance with a second signal that is input from a second detector that detects a value reflecting a bicycle speed, the first control state and the second control state being automatically switched based on the detected first signal and the second signal.

2. The bicycle transmission control device as recited in claim 1, wherein
the second detector detects a rotation of a wheel of the bicycle.

3. The bicycle transmission control device as recited in claim 2, wherein
the first detector detects a minimum angle in one rotation of the crank that is smaller than a minimum angle in one rotation of the wheel that can be detected by the second detector.

4. The bicycle transmission control device as recited in claim 1, wherein
the first control state and the second control state are further switched based on a manual drive force that is applied to the crank.

5. The bicycle transmission control device as recited in claim 1, wherein
the transmission controller is further programmed to output a control signal for controlling the transmission based on the first signal when a rotational speed of the crank based on the first signal is greater than or equal to a maximum rotational speed of the crank based on the second signal.

6. The bicycle transmission control device as recited in claim 1, wherein
the transmission controller is further programmed to output a control signal for controlling the transmission based on the second signal when a maximum rotational speed of the crank based on the second signal is greater than a rotational speed of the crank based on the first signal.

7. The bicycle transmission control device as recited in claim 1, wherein
the transmission controller is further programmed to output a control signal for controlling the transmission when controlling the transmission based on the first signal so that the rotational speed of the crank based on the first signal will be a prescribed crank rotational speed or a crank rotational speed within a prescribed range.

8. The bicycle transmission control device as recited in claim 1, wherein
the transmission controller is further programmed to output a control signal for controlling the transmission when controlling the transmission based on the second signal so that a maximum rotational speed of the crank based on the second signal will be a prescribed crank rotational speed or a crank rotational speed within a prescribed range.

9. The bicycle transmission control device as recited in claim 8, wherein
the maximum rotational speed of the crank based on the second signal is obtained based on the second signal, information related to a gear ratio, and information related to at least one of a wheel diameter, a wheel radius, or a wheel circumference.

10. The bicycle transmission control device as recited in claim 1, wherein
the transmission controller is further configured to operate the transmission so that a gear ratio becomes greater when the transmission is controlled based on the first signal and when the rotational speed of the crank is greater than or equal to a first upper limit value,
the transmission controller is further configured to operate the transmission so that the gear ratio becomes smaller when the transmission is controlled based on the first signal and when the rotational speed of the crank is less than or equal to a first lower limit value,
the transmission controller is further configured to operate the transmission so that the gear ratio becomes greater when the transmission is controlled based on the second signal and when a maximum rotational speed of the crank corresponding to the second signal is greater than or equal to a second upper limit value, and
the transmission controller is further configured to operate the transmission so that the gear ratio becomes smaller when the transmission is controlled based on the second signal and when the maximum rotational speed of the crank corresponding to the second signal is less than or equal to a second lower limit value.

11. A bicycle transmission control device comprising:
a transmission controller programmed to
switch between a first control state for controlling a transmission based on a first signal that is input from a first detector that detects a rotation of a crank, and a second control state for controlling the transmission based on a second signal that is input from a second detector that detects a value reflecting a bicycle speed, the first control state and the second control state being switched based on the first signal, the second signal and a manual drive force that is applied to the crank, and being
further programmed to output a control signal for controlling the transmission based on the second signal when a maximum rotational speed of the crank based on the second signal is greater than the rotational speed of the crank based on the first signal, and the manual drive force is less than a prescribed value.

12. A bicycle transmission control device comprising:
a transmission controller programmed to
switch between a first control state for controlling a transmission based on a first signal that is input from a first detector that detects a rotation of a crank, and a second control state for controlling the transmission based on a second signal that is input from a second detector that detects a value reflecting a bicycle speed, the first control state and the second control state being switched based on the first signal, the second signal and a manual drive force that is applied to the crank, and being
further programmed to output a control signal for controlling the transmission based on the first signal when a maximum rotational speed of the crank based on the second signal is greater than the rotational speed of the crank based on the first signal, and the manual drive force is greater than or equal to a prescribed value.

13. A bicycle transmission control device comprising:
a transmission controller programmed to
switch between a first control state for controlling a transmission based on a first signal that is input from a first detector that detects a rotation of a crank, and a second control state for controlling the transmission based on a second signal that is input from a second detector that detects a value reflecting a bicycle speed, the first control state and the second control state being switched based on the first signal, the second signal and a manual drive force that is applied to the crank, and being
further programmed to output a control signal for controlling the transmission based on the first signal when the manual drive force is greater than or equal to a prescribed value.

14. A bicycle transmission control device comprising:
a transmission controller programmed to
switch between a first control state for controlling a transmission based on a first signal that is input from a first detector that detects a rotation of a crank, and a second control state for controlling the transmission based on a second signal that is input from a second detector that detects a value reflecting a bicycle speed, the first control state and the second control state being switched based on a manual drive force that is applied to the crank, and being
further programmed to output a control signal for controlling the transmission based on the second signal when the manual drive force is less than a prescribed value.

15. A bicycle transmission control device comprising:
a transmission controller programmed to
switch between a first control state for controlling a transmission based on a first signal that is input from a first detector that detects a rotation of a crank, and a second control state for controlling the transmission based on a second signal that is input from a second detector that detects a value reflecting a bicycle speed, the first control state and the second control state being switched based on the first signal, the second signal and a manual drive force that is applied to the crank, the manual drive force being obtained based on a third signal that is input from a drive force sensor that outputs the third signal in response to the manual drive force that is applied to the crank.

16. A bicycle transmission control device comprising:
a transmission controller programmed to
switch between a first control state for controlling a transmission based on a first signal that is input from a first detector that detects a rotation of a crank, and a second control state for controlling the transmission based on a second signal that is input from a second detector that detects a value reflecting a bicycle speed, and being
further programmed to output a control signal for controlling the transmission based on the second signal when an abnormality has occurred with the first signal.

17. A bicycle transmission control device comprising:
a transmission controller programmed to
switch between a first control state for controlling a transmission based on a first signal that is input from a first detector that detects a rotation of a crank, and a second control state for controlling the transmission based on a second signal that is input from a second detector that detects a value reflecting a bicycle speed, and being
further programmed to output a control signal for controlling the transmission based on the first signal when an abnormality has occurred with the second signal.

18. A bicycle transmission control device comprising:
a transmission controller programmed to
switch between a first control state for controlling a transmission based on a first signal that is input from a first detector that detects a rotation of a crank, and a second control state for controlling the transmission based on a second signal that is input from a second detector that detects a value reflecting a bicycle speed,
operate the transmission so that a gear ratio becomes greater when the transmission is controlled based on the first signal and when the rotational speed of the crank is greater than or equal to a first upper limit value,
operate the transmission so that the gear ratio becomes smaller when the transmission is controlled based on the first signal and when the rotational speed of the crank is less than or equal to a first lower limit value,
operate the transmission so that the gear ratio becomes greater when the transmission is controlled based on the second signal and when a maximum rotational speed of the crank corresponding to the second signal is greater than or equal to a second upper limit value,
operate the transmission so that the gear ratio becomes smaller when the transmission is controlled based on the second signal and when the maximum rotational speed of the crank corresponding to the second signal is less than or equal to a second lower limit value, and
the transmission controller being further configured to set the second upper limit value to be less than the first upper limit value.

19. A bicycle transmission control comprising:
a transmission controller programmed to
switch between a first control state for controlling a transmission based on a first signal that is input from a first detector that detects a rotation of a crank, and a second control state for controlling the transmission based on a second signal that is input from a second detector that detects a value reflecting a bicycle speed,
operate the transmission so that a gear ratio becomes greater when the transmission is controlled based on the first signal and when the rotational speed of the crank is greater than or equal to a first upper limit value,
operate the transmission so that the gear ratio becomes smaller when the transmission is controlled based on the first signal and when the rotational speed of the crank is less than or equal to a first lower limit value,
operate the transmission so that the gear ratio becomes greater when the transmission is controlled based on the second signal and when a maximum rotational speed of the crank corresponding to the second signal is greater than or equal to a second upper limit value, operate the transmission so that the gear ratio becomes smaller when the transmission is controlled based on the second signal and when the maximum rotational speed of the crank corresponding to the second signal is less than or equal to a second lower limit value, and the transmission controller being further configured to set the second lower limit value to be greater than the first lower limit value.

20. A bicycle transmission control device comprising:

a transmission controller programmed to switch between a first control state for controlling a transmission based on a first signal that is input from a first detector that detects a rotation of a crank, and a second control state for controlling the transmission based on a second signal that is input from a second detector that detects a value reflecting a bicycle speed, operate the transmission so that a gear ratio becomes greater when the transmission is controlled based on the first signal and when the rotational speed of the crank is greater than or equal to a first upper limit value, operate the transmission so that the gear ratio becomes smaller when the transmission is controlled based on the first signal and when the rotational speed of the crank is less than or equal to a first lower limit value, operate the transmission so that the gear ratio becomes greater when the transmission is controlled based on the second signal and when a maximum rotational speed of the crank corresponding to the second signal is greater than or equal to a second upper limit value, operate the transmission so that the gear ratio becomes smaller when the transmission is controlled based on the second signal and when the maximum rotational speed of the crank corresponding to the second signal is less than or equal to a second lower limit value, and the transmission controller being further configured to set a range between the second upper limit value and the second lower limit value to be 25% to 50% of a range between the first upper limit value and the first lower limit value.

21. A bicycle transmission control device comprising:

a transmission controller programmed to switch between a first control state for controlling a transmission based on a first signal that is input from a first detector that detects a rotation of a crank, and a second control state for controlling the transmission based on a second signal that is input from a second detector that detects a value reflecting a bicycle speed, operate the transmission so that a gear ratio becomes greater when the transmission is controlled based on the first signal and when the rotational speed of the crank is greater than or equal to a first upper limit value, operate the transmission so that the gear ratio becomes smaller when the transmission is controlled based on the first signal and when the rotational speed of the crank is less than or equal to a first lower limit value, operate the transmission so that the gear ratio becomes greater when the transmission is controlled based on the second signal and when a maximum rotational speed of the crank corresponding to the second signal is greater than or equal to a second upper limit value, operate the transmission so that the gear ratio becomes smaller when the transmission is controlled based on the second signal and when the maximum rotational speed of the crank corresponding to the second signal is less than or equal to a second lower limit value, the transmission controller being further configured to not operate the transmission when the rotational speed of the crank reaches a range below the first upper limit value and above the first lower limit value during a period from when the rotational speed of the crank is greater than or equal to the first upper limit value or less than or equal to the first lower limit value until when a first standby period elapses, when the transmission is controlled based on the first signal, and the transmission controller being further configured to not operate the transmission when the rotational speed of the crank reaches a range below the second upper limit value and above the second lower limit value during a period from when the maximum rotational speed of the crank is greater than or equal to the second upper limit value or less than or equal to the second lower limit value until when a second standby period elapses, when the transmission is controlled based on the second signal.

22. The bicycle transmission control device as recited in claim 21, wherein the transmission controller is further configured to set the second standby period to be less than or equal to the first standby period.

23. The bicycle transmission control device as recited in claim 21, wherein the transmission controller is further configured to set the first standby period and the second standby period based on a travel load of the bicycle.

24. The bicycle transmission control device as recited in claim 23, wherein the transmission controller is further configured to set the second standby period to be less than or equal to the first standby period when the travel load of the bicycle is included in a same range.

25. The bicycle transmission control device as recited in claim 24, wherein the transmission controller is further configured to set the first standby period and the second standby period based on a previous shifting operation of the transmission and the travel load of the bicycle.

* * * * *